Figure 1:
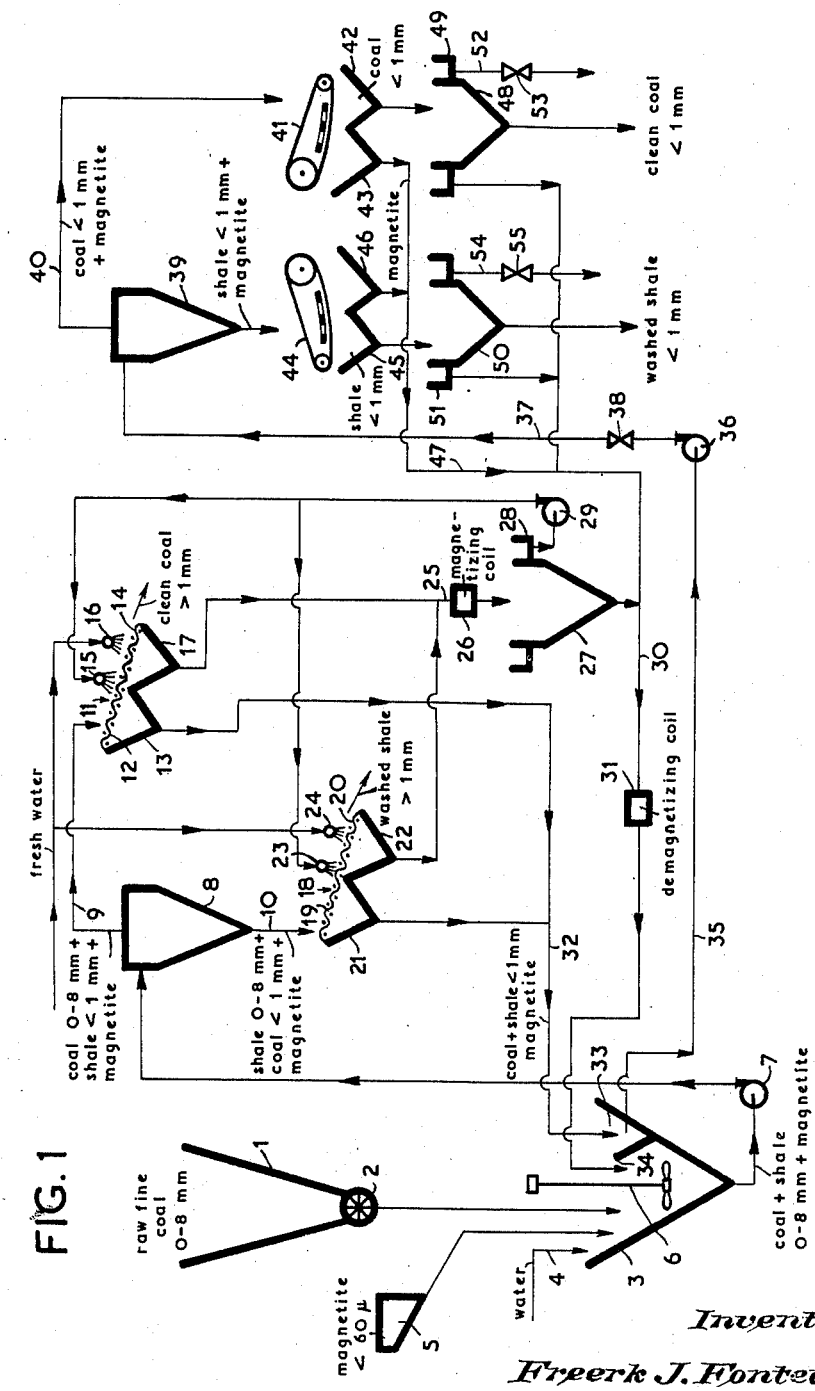

Dec. 30, 1952     F. J. FONTEIN     2,623,637
SYSTEM OF SEPARATION

Filed Aug. 17, 1949     2 SHEETS—SHEET 2

Inventor:
Freerk J. Fontein,
By Cushman, Darby & Cushman
Attorneys.

Patented Dec. 30, 1952

2,623,637

UNITED STATES PATENT OFFICE 2,623,637

SYSTEM OF SEPARATION

Freerk J. Fontein, Heerlen, Netherlands, assignor to Maatschappij voor Kolenbewerking Stamicarbon N. V., Heerlen, Netherlands Application August 17, 1949, Serial No. 110,831
In the Netherlands August 20, 1948

13 Claims. (Cl. 209—173)

The present invention relates to the separation according to specific gravity of mixtures of solid particles having different specific gravities and different sizes, including fine particles, with the aid of a suspension.

Various processes have been developed to effect this separation. For instance the so-called float and sink process, in which the particles are separated by means of a medium having a specific gravity intermediate the specific gravities of the particles to be separated, has been widely employed in this field. In this process the particles having a specific gravity higher than that of the medium sink to the bottom of the separator, whereas the particles having a specific gravity lower than that of the medium float on the surface of the medium. The particles thus separated are withdrawn separately by appropriate means together with a certain portion of the heavy medium.

Furthermore, as described and claimed in the applications of Maximiliaan G. Driessen et al., Serial No. 664,320 and Serial No. 664,323 filed April 23, 1946, the separation may also be effected by introducing the mixture together with a suitable heavy medium under pressure into the tangential inlet of a cyclone. In this way, high centrifugal forces will be created within the cyclone and these forces will be substantially in excess of gravitational forces, with the result that a specifically light fraction will leave the cyclone through the central base opening, and a specifically heavy fraction will leave the cyclone through the apex opening.

In the application of these processes many heavy solids may be used as suspensoid, e. g., loess, baryte magnetite, the fine heavy constituents of the mixture to be separated itself, etc. As the total cost of the separating process is for a considerable part determined by the cost of the heavy medium, it is of importance to recover the medium adhering to the separated products and to clean this medium for reuse.

Further it appears that the separation becomes less satisfactory the smaller the particles to be separated are.

If a mixture of particles ranging from zero to, e. g., 4 mm. has to be separated, a satisfactory separation can be obtained for the size range down to e. g. 1 mm., whereas the particles under 1 mm. are separated in an unsatisfactory way, i. e., too many particles of a specific gravity higher than the specific gravity of separation will be found in the fraction having a specific gravity lower than the specific gravity of separation and vice versa.

It will be understood that whether a separation is satisfactory or not depends on the requirements for the cleaned products. If, e. g., clean coal of a given ash content, say 6%, has to be delivered, the separation has to take place at a specific gravity, related to that ash content, in other words, if the faults in the separation for a certain size range become too high, i. e., when too many particles of a specific gravity higher than the specific gravity of separation occur in the cleaned coal fraction, it will be obvious that the ash content of that clean coal fraction will be too high.

Therefore, once the requirements for the clean coal, i. e., the highest permissible ash content, are known, the specific gravity of separation can be determined and also the maximum permissible fault in the separation.

In more detail, if the separation is to be completely perfect, the specific gravity of separation should be equal to the specific gravity corresponding to the required ash content. Since the separation is not perfect, the specific gravity of separation must be kept on a lower level which of course affects the yield in an unfavorable way.

Since the faults in the separation increase the finer the particles are, it would be necessary in the event of separating a mixture including fine particles to set the specific gravity of separation on a much lower value, in order to obtain a clean coal of the desired ash content and therefore the yield and consequently the efficiency of the process would become lower.

The following example will elucidate this phenomenon.

Raw fine coal ranging in size from zero to 4 mm., 46% of which has a size minus 1 mm., is mixed with a suspension of magnetite in water, the suspension having a specific gravity of 1.41. After mixing, the concentration of the raw fine coal in the suspension amounts to 530 grams/litre. This mixture is treated in a cyclone at a rate of 2.54 tons raw fine coal per hour. The separated fractions are screened on 2, 1 and 0.5 mm. and the thus obtained grain fractions are analized in order to determine the Tromp-curve of each fraction. The following results were obtained.

| Grain fraction | Area Tromp-curve |
|---|---|
| | Units |
| 0.5 mm | 84.6 |
| 0.5–1 mm | 55.0 |
| 1–2 mm | 34.9 |
| 2–4 mm | 16.0 |

Since the area of the Tromp-curve (see "The Colliery Guardian," pages 955 to 959, New Methods of Computing the Washability of Coals, vol. CLIV, No. 3986, London, Friday, May 21, 1937) is a measure for faults in the separated fractions it will be clear from the above example that the accuracy of the separation diminishes for the smaller particles.

Furthermore, the higher the concentration of solids the higher the critical value under which the separation becomes unsatisfactory. Therefore it was necessary in order to obtain a satisfactory separation to eliminate the particles of a size under that critical value before subjecting the mixture to the separation process. These eliminated particles of the mixture naturally have to be separated in another way.

Given the characteristics of a certain separation process the capacity of the installation is determined by the maximum concentration of solids which is admissible. Therefore, it is of great importance to have this concentration as high as possible, preferably as close as possible to the highest admissible value.

It is the principal object of the invention to provide a process by which a mixture of particles differing in specific gravity and grain size including fine particles can satisfactorily be separated according to specific gravity at a high capacity without removing the finer particles. Another object of the invention is to simply the recovering of the suspensoid considerably. It is also an object of the invention to provide a process in which the concentration of the fine particles in the mass fed to the specific gravity separator is higher than in known processes and can be maintained at the highest admissible value.

Figure 2:
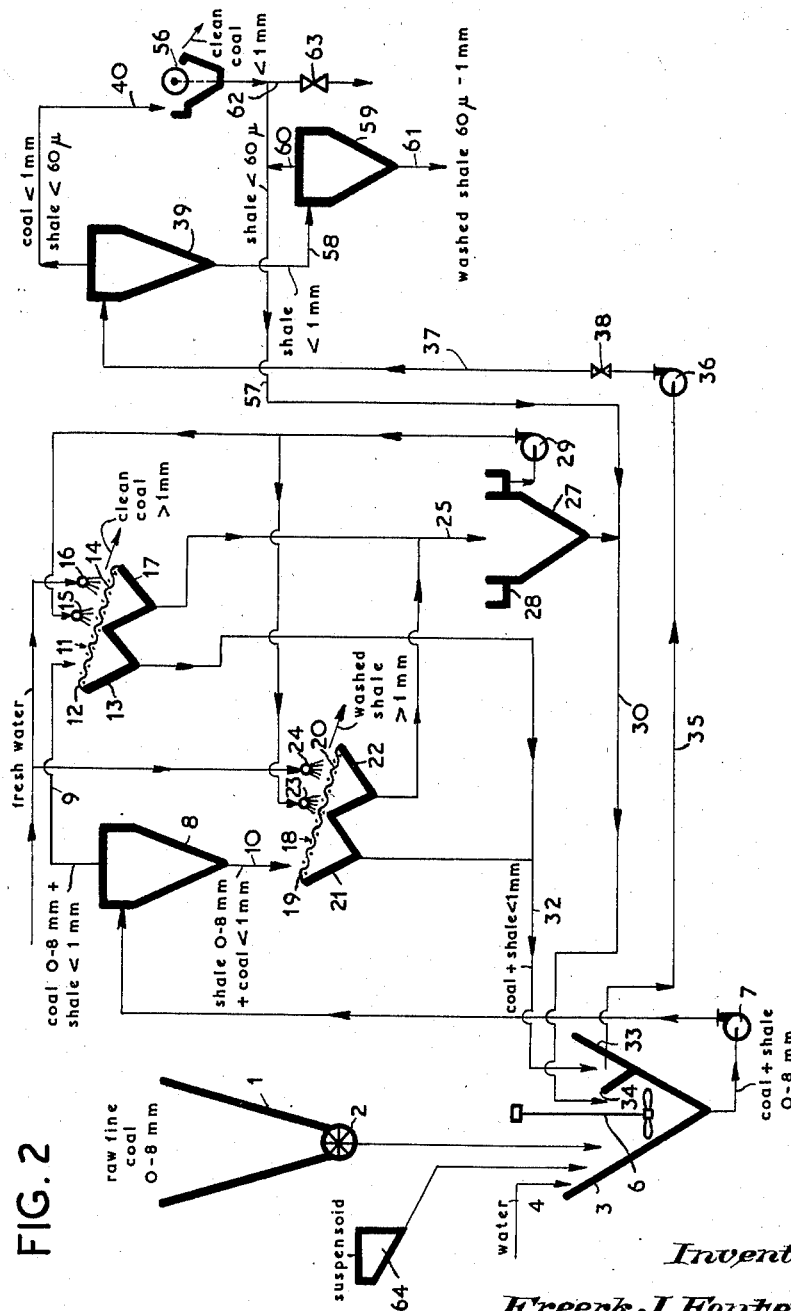

Other objects and advantages of the invention will be apparent from the following specification and accompanying drawings, wherein Figure 1 is a diagrammatic showing of an apparatus used in performing the system and Figure 2 is a diagrammatic view illustrating a modification of the apparatus of Figure 1.

According to the embodiment of the invention hereinafter particularly described, the process is used to separate raw coal including fine particles into clean coal particles and refuse material such as shale, pyrite etc. hereinafter for convenience' sake called shale. Furthermore, one embodiment of the invention is hereinafter described as involving the use as a separation medium of a liquid suspension of particles having a specific gravity higher than the specific gravity of separation and in a specific gravity separator of the cyclone type. However, it will be understood that the invention is applicable to the separation of materials other than raw coal and that the separation can also be performed in specific gravity separators of the suspension type other than a cyclone.

Referring to Figure 1, the numeral 1 designates a hopper into which raw coal including a certain percentage of fine coal and shale particles is delivered from a suitable source. In the embodiment herein described, the coal delivered to hopper 1 will have a size range up to eight mm. Hopper 1 has its outlet controlled by a rotating feed controller designated 2 which operates to continuously deliver a steady stream of the mass in hopper 1 to a mixing tank 3. At least during the initial stage of a run, water will be introduced to the mixing tank from a line 4 to form a suspension. Particles of magnetite of a size smaller than 60 microns and having a specific gravity of 4.6 will also be introduced into the tank 3 from a source 5. If desired, loess, baryte or similar substances may be used instead of magnetite and the Figure 2 embodiment of the invention involves the use of fine shale as suspensoid. The materials fed into the mixing tank 3 as described above will be mixed by an impeller 6.

From the mixing tank the suspension is introduced under pressure into a cyclone or series of cyclones 8 by means of pump 7.

The concentration of solids in mixing tank 3 and hence of the infeed of the cyclones 8 is chosen at such a high value that the described specific gravity separation described immediately below will only take place for particles larger than a given size e. g. 1 mm. Data about the concentration value, the specific gravity of separation etc. will be given in a specific example.

As is indicated in Figure 1, the lighter fraction leaving the cyclone 8 through the central base opening and moving through line 9 will comprise coal ranging in size up to eight mm., shale of a size smaller than one mm., and a part of the magnetite suspension. The heavier fraction moving through the apex outlet and line 10 will include shale ranging in size up to eight mm., coal of a size smaller than one mm., and the remaining part of the magnetite suspension. Thus, as has been described above, the separation achieved in cyclone 8 will only separate according to the desired specific gravity of separation the larger particles of coal from the larger particles of shale, the remainder of both particles, as well as the magnetite suspension, will move through both outlets.

Line 9 delivers the lighter or large coal containing suspension fraction to a series of screens generally designated by the numeral 11 and which may be of the vibratory type. The suspension first moves upon a screen 12 of one mm. mesh and through which a part of the particles smaller than one mm. and water may pass into a receiver 13 mounted below screen 12. The remainder of the mass will move onto a screen 14 also of one mm. mesh and upon which water is directed from a spray head 15 to which water is delivered as hereinafter described. A fresh water spray head 16 is positioned further along screen 14. As a result of the spraying action which occurs on screen 14, all particles smaller than one mm. will be washed off the larger particles of coal so that clean coal of a size larger than one mm. will move off the screening apparatus 11. The particles washed off by the spray action will fall into a receiver 17. It will be observed that the material in receiver 13 is an undiluted suspension of small particles, whereas the suspension in receiver 17 is a diluted suspension of small particles, and because of the addition of water thereto from the spray heads 15 and 16.

Referring now to the discharge from apex outlet of cyclone 8 through line 10, this will move to a screening apparatus generally designated 18 and which also may be vibratory. The apparatus 18 also includes two screens 19 and 20, each of one mm. mesh, with receivers 21 and 22 below the respective screens. As the material moves along the screens 19 and 20, a part of the small particles in suspension will pass through screen 19 into the receiver 21, this suspension being undiluted. The material will then move onto screen 20, first passing below a spray head 23 in circuit with the spray head 15 and then beneath a fresh water spray head 24. The action of the sprays will cause particles of a size smaller than one mm.

to be washed from the larger particles to thereby fall into the receiver 22. Hence, washed shale particles larger than one mm. will move off the final screen 20 of the screening apparatus 18.

It will be observed from the foregoing that the output of the screening mechanisms 11 and 18 respectively consists of clean coal and clean shale of a size larger than one mm. As is hereinafter described, the system further involves a secondary separation of a controlled portion of the screen-through or fines from receivers 13 and 21 into two fractions, one fraction consisting of particles of coal smaller than one mm. and the other fraction consisting of particles of shale smaller than one mm. This portion is so controlled that the secondary separation receives a predetermined quantity of suspension whereas the remainder flows back into mixing tank 3. This predetermined quantity is so adjusted that the amount of particles delivered per time unit to the secondary system corresponds with the amount of particles in the raw coal under 1 mm. fed per same time unit into tank 3. The other portion of the screen-through, namely, from receivers 17 and 22, will be thickened and returned to mixing tank 3.

In the secondary separation magnetic means are provided to separate the magnetite from the separated fractions, the magnetite recovered in this way being returned to mixing tank 3; also, thickeners are provided to thicken the coal and shale fractions. Water from said thickeners is also returned to mixing tank 3. In this way, the proper proportion of magnetite and other particles smaller than one mm. will be maintained in the mixing tank 3 and the infeed to cyclone 8. The diluted suspension of the receivers 17 and 22 moves to a line 25 including a magnetizing coil 26 which will cause particles of the fine magnetite to adhere to each other to form small groups of magnetite. Then the mass moves into a thickener 27 of suitable design.

The reason for the magnetising is that clumps of magnetite more readily sink in the thickener than fine magnetite particles, so that thickeners of smaller dimensions and larger capacity can be used. Moreover, without magnetising the magnetite particles, they would easily be discharged together with the overflow.

It is obvious that before the thickened suspension can be reused it is necessary to demagnetise the magnetised particles in order to bring them in their original state.

In the thickener 27 the water in the mass will move from the overflow 28 to pump 29 which will move it to the spray heads 15 and 23 respectively associated with the screens 14 and 20. The thickened product of thickener 27, viz., the solids, with a certain water content, will move through the bottom outlet of thickener 27 to a line 30 including a demagnetizing coil 31, which line delivers the material directly to the mixing tank 3.

Coil 31 will demagnetize the magnetite particles so that they will disperse in the suspension.

From the above it will be clear that the magnetite necessary to obtain a suspension of appropriate specific gravity to carry out a specific gravity separation of the particles above 1 mm. in cyclone 8, comes from the following sources:

(1) Part of it circulates from cyclone 8 through screens 14 and 20, receivers 17 and 22, through magnetising coil 26, thickeners 27, demagnetising coil 31, mixing tank 3, pump 7 to cyclone 8.

(2) Another part circulates from cyclone 8 through screens 12 and 19, receivers 13 and 21, through the secondary separation where they are recovered by the magnetic means, mentioned above (described below in more detail), back to mixing tank 3 from which it is pumped again by pump 7 to cyclone 8.

(3) Magnetite from supply sources and which replaces the magnetite which is lost by adherence to cleaned products and thus leaves the system.

Referring in more detail to the above mentioned secondary separation the undiluted suspension or screen-through which falls into the receivers 13 and 21 moves to a line 32 which delivers this suspension to a tank 33 including a weir 34 over which suspension may overflow into the mixing tank 3. Tank 33 has an outfeed line 35 leading therefrom to a pump 36 having its outlet line 37 controlled by a valve 38. With pump 36 in operation under the control of valve 38, material will move from tank 33 through line 35, pump 36, and valve 38 at a certain pressure to the tangential inlet of a cyclone 39. Cyclone 39 is similar in construction to the cyclone 8.

As explained hereabove the suspension fed into cyclone 39 contains raw coal particles under 1 mm. and magnetite which coal particles will be separated according to specific gravity so that clean coal of the desired ash content and magnetite will leave the cyclone through the central base opening, whereas shale and magnetite will leave the cyclone through its apex opening.

The clean coal particles, magnetite, and water leaving the base outlet of cyclone 39 move by a line 40 to a magnetic separator 41. By the action of this separator, the coal particles will fall into a receiver 42 along with part of the water, while the magnetite and the remaining water will fall into a receiver 43. The shale fraction, magnetite, and water moving from the apex outlet of cyclone 39 will pass to a magnetic separator 44 including a receiver 45 for the shale and a receiver 46 for the magnetite. The magnetite receivers 43 and 46 deliver their contents to a line 47 connected to the line 30 leading from thickener 27 to mixing tank 3. Hence, this magnetite will be demagnetized in the coil 31 included in line 30.

The coal particles and water in receiver 42 will move to a thickener 48 e. g. of the Door type. Thickener 48 will discharge the coal particles from its bottom outlet and the bulk of the water will flow over into a surrounding launder 49. Shale particles and water will move from the receiver 45 of magnetic separator 44 to the infeed of a thickener 50 similar to thickener 48. The shale particles will move from the bottom outlet of thickener 50 while the bulk of the water will flow over into a surrounding launder 51.

The overflowing water from thickeners 48 and 50 is lead back to mixing tank 3 through a line 39. Surplus water may be bled off from the system through a line 52, the quantity of which can be regulated by valve 53. Also water can be bled off through line 54, the quantity of which may be regulated by valve 55.

The clean coal particles moving from the bottom outlet of thickener 48 may be used as desired and the same is true of the shale particles moving from the bottom outlet of the thickener 50. These coal and shale particles naturally will be of a size smaller than one mm.

To summarize the operation and its advantages, raw coal including fine particles down to zero mm. is subjected to a separating action in a suspension formed of water and magnetite, the concentration of which supension deliberately being kept so high that the desired specific gravity separation only takes place for particles larger than a given size, e. g., 1 mm.

From both fractions obtained the particles larger than said size are screened, so that clean coal larger than said size and shale particles larger than said size are obtained in the first separation stage.

By dividing the screen-through of both screening apparatus into two parts, one of which is returned to the first separation stage and the second of which is subjected to a secondary separation, and proportioning both parts in such a way that the amount of particles to be separated in the second stage corresponds to the amount of particles under the above mentioned size occurring in the raw fine coal, a secondary separation of limited capacity is only needed, whereas a recuperation of the suspensoid viz., magnetite, is only necessary in the secondary separation.

The proportioning of the above mentioned two parts of the screen-through is obtained by a valve 38, which limits the quantity fed into the secondary separation, whereas the remainder is permitted to return to the primary separation by flowing over weir 34 into mixing tank 3.

Another way to obtain this proportioning is, in the event that more cyclones are used in a secondary separation, to provide the infeed line of each cyclone with a valve so as to enable the cutting out of one or more cyclones.

It will be noted that (a) the quantity of raw fine coal which enters into the system per unit of time is constant, (b) the size distribution of the raw coal delivered to hopper 1 will be substantially constant and (c) the magnetite leaving the system is proportional to the amount of cleaned products which leave the system, and so is also constant. Hence, the concentration in mixing tank 3 and hence of the infeed of cyclone 8, can easily be kept constant by setting valve 38 and by supplying from source 5 as much magnetite as leaves the system together with the cleaned products. This setting readily can be done after a few minutes of initial operation. Hence, once valve 38 has been set to a proper position, it will not be necessary to change it until the operator is advised that a run of entirely different characteristics is to be handled.

*Specific example of operation of Figure 1 system*

As an example of the manner of operating the system in accordance with Figure 1, at the start of a run, raw coal, viz., particles of coal and shale, of a size ranging from zero to eight mm., and of which thirty per cent is smaller than one mm., will be fed at a rate of 100 tons per hour into the mixing tank 3 in which tank the above mentioned mass will be mixed with a suspension of water and magnetite in such a proportion that one ton of raw coal is mixed with 2.5 cubic meters of suspension. The tons referred to in this specification are metric tons.

The amount of magnetite in the suspension is so proportioned with respect to the amount of water that the specific gravity of this suspension amounts to 1.4 which means that one litre of the magnetite suspension contains about 500 grams of magnetite and 0.9 litre of water. Pump 7 will move the mass from mixing tank 3 at an overpressure of approximately 0.75 atmosphere and at a rate of 350 cubic meters per hour into a set of three cyclones such as 8 having the following dimensions:

Maximum diameter _____ 350 mm.
Infeed opening _____ 100 mm. diameter.
Base opening _____ 150 mm. diameter.
Apex opening _____ 65 mm. diameter.
Apex angle _____ 20°.

Fifty tons per hour of clean coal of a size above one mm. will be obtained as the output of the screening apparatus 11 and twenty tons per hour of washed shale larger than one mm. will be discharged from the screening apparatus 18, leaving thirty tons of particles of coal and shale per hour as the fines resulting from the screening.

When starting the operation the concentration of the fine raw coal particles in the mixing tank is relatively low. By adjusting the valve 38 the secondary system is cut out partly or as a whole, so that the fine particles return to the mixing tank. This causes the concentration of these particles in the mixing tank to increase. When this concentration has increased to about 250 grams per litre the secondary separation system is put in operation. The capacity of the secondary system is so adjusted that the amount of fine particles discharged from this system is equal to the amount of fine particles fed by the raw coal into the mixing tank. In the example the fine particles in suspension are pumped from the receiver 33 by pump 36 at an overpressure of one atmosphere and at a rate of 120 cubic meters per hour to three cyclones 39 having the following dimensions:

Maximum diameter _____ 350 mm.
Infeed opening _____ 50 mm. diameter.
Base opening _____ 100 mm. diameter.
Apex opening _____ 50 mm. diameter.
Apex angle _____ 20°.

The quantity of clean fine coal discharged from the bottom outlet of thickener 48 will amount to twenty tons per hour, and the quantity of washed fine shale particles discharged from thickener 50 will amount to ten tons per hour.

In operation, the concentration of the fine particles in the secondary system amounts to 30 tons per 120 cubic meters, that is, 250 grams per litre, which is admissable to obtain a satisfactory separation. The concentration of the fine particles in the primary system also amounts to 250 grams per litre whereas the concentration of the particles bigger than one mm. in this system amounts to $$\frac{70.000}{350} = 200 \text{ grams per litre}$$

The total concentration of the mass introduced into the primary separators thus amounts to 450 grams per litre with which concentration only particles bigger than 1 mm. are satisfactorily separated. With an infeed of 350 cubic metres per hour besides 70 tons of coarser particles, 87.5 tons of raw coal particles smaller than 1 mm. are delivered to the primary system, 57.5 tons of which are returned to the mixing tank and 30 tons to the secondary system.

As the magnetite now only has to be recovered from the separated fractions in the secondary system this recovery is considerably simplified. With a concentration of 250 grams per litre the amount of 120 cubic metres delivered into the secondary system includes 30 tons of raw coal (mean specific gravity of the raw coal is 1.5) and 100 cubic metres of suspension, from which 50 tons per hour of magnetite has to be recovered.

If the suspension had to be recovered from the total feed a regeneration system with a capacity of 100×2.5×0.5=125 tons per hour would be necessary.

In the Figures 1 and 2 like parts are indicated with like references.

With the Figure 2 arrangement the raw coal having a size range up to eight mm. including fine coal and shale particles is fed into the mixing tank 3 which tank in this example contains a suspension of fine shale having a size up to 60 microns.

When starting the operation the mixing tank is filled with such a suspension by introducing water from line 4 and adding fine shale from a source 64 in the desired proportion.

It will be understood that as a starting suspension other suspensoids, such as loess, may be used. During operation the oxogenous material which is lost by adhering to the discharged separated products is replaced by the fine shale particles included in the feed, so that as no exogenous particles are supplied the suspension finally only contains fine shale as suspensoid.

The primary separation stage of the Figure 2 embodiment differs from the corresponding part of the example described with reference to Figure 1 in that the magnetizing coil 26 and the demagnetizing coil 31 are omitted and the magnetite bin 5 is replaced by a source 64 of suspensoid.

With the secondary system in operation, pump 36 will move the material from receptacle 33 to a cyclone 39. It will be appreciated from the above discussion of Figure 1 that the material in receptacle 33 will comprise a suspension of coal and shale smaller than one mm. and which is delivered to receptacle 33 by line 32 leading from the screening receivers 13 and 21. Cyclone 39 will operate to separate the material fed thereto so that shale will move from the apex outlet by line 58 to a classifier 59. Classifier 59 will deliver shale particles ranging in size from 60 microns to 1 mm. through a line 61 while shale particles smaller than 60 microns will move through a line 60 associated with the return line 30, which delivers the shale particles smaller than 60 microns to the mixing tank 3.

The drawing indicates classifier 59 as a cyclone classifier. However, any other classifier may be used.

Cyclone 39 has a line 40 connected to its base outlet and through which it discharges the coal particles smaller than 1 mm. as well as shale particles smaller than 60 microns. Line 40 delivers these particles to a filtering apparatus 56. This apparatus removes the water and the particles smaller than 60 microns from the mass and may deliver such water and small particles by line 57 which joins line 30 to mixing tank 3. The dewatered clean coal particles smaller than one mm. are discharged as indicated at the right of Figure 2. The excess of water and possibly of fine particles may be bled off through line 62 by means of a control valve 63. If desired line 57 may include a froth flotating machine adapted to remove the coal particles smaller than 60 microns which pass the meshes of the filter cloth of apparatus 56.

With an installation of the same capacity as given in the example described with reference to Figure 1 and handling the same feed, one litre of the separating suspension will now contain 650 grams of shale particles smaller than 60 microns in order to obtain a specific gravity of 1.4 (specific gravity of shale 2.6). Correspondingly 65 tons per hour of suspension have now to be recovered from the fractions discharged from the secondary separation.

In the above described examples the throughput of the screens 12 and 19 is combined and subjected to a secondary treatment. It will be understood, however, that advantage may be taken of the partial separation already obtained in the primary system by treating the fractions collected in the receivers 13 and 21 separately. It lies also within the scope of the invention to effect the separation in more than two stages. For instance, a mixture of particles ranging in size up to 80 mm. may first be treated according to the float and sink method, whereby the particles bigger than 8 mm. are separated in a satisfactory way. The second stage consists of cyclones handling the particles smaller than 8 mm. resulting from the first stage, so as to separate the particles bigger than one mm. satisfactorily and finally a third stage in which the particles smaller than one mm. are separated.

It will be understood that the invention is not limited by the examples of operation and figures described hereabove, but that various changes may be made without departing from the principles and scope of the invention being defined in the following claims.

I claim:

1. A continuous method for separating a mixture of particles of different specific gravity and wide size range comprising delivering the mixture into a fluid mass consisting of a suspension of water and a sufficient amount of fine suspensoid particles to have a density intermediate that of the particles of the mixture to be separated, maintaining a high concentration of said mixture in the fluid mass by delivery of the mixture at a high rate, subjecting the mixture and fluid mass to a force effective to separate the same into a first heavy fraction and a first light fraction, the first heavy fraction containing finer particles, suspension, and substantially all of the coarser higher gravity particles, and the first light fraction containing finer particles, suspension, and substantially all of the coarser lower gravity particles, draining finer particles and suspension from said two fractions, then washing the drained fractions, thickening the washings and returning such thickened material to said fluid mass, subjecting a controlled part of the drainings to centrifugal separation to obtain a second heavy fraction containing suspension and substantially all of the heavier finer particles and a second light fraction containing suspension and substantially all of the lighter finer particles, recovering suspensoid from the second fractions, and returning the recovered suspensoid to said fluid mass.

2. A method of the character described in claim 1 wherein the force to which the combined mixture and fluid mass is subjected is centrifugal force.

3. A method of the character described in claim 1 wherein the force to which the combined mixture and fluid mass is subjected is gravity.

4. A continuous method for separating a mixture of particles of different specific gravity and wide size range comprising delivering the mixture into a fluid mass consisting of a suspension of water and a sufficient amount of fine suspensoid particles to have a density intermediate that of the particles of the mixture to be separated, maintaining a high concentration of said mixture in the fluid mass by delivery of the mixture at a high rate, subjecting the combined mixture and fluid mass to a force effective to separate the same into a first heavy fraction and a first light fraction, the first heavy fraction containing finer particles, suspension, and substantially all of the coarser higher gravity particles, and the first light fraction containing finer particles, suspension, and substantially all of the coarser lower gravity particles, draining finer particles and suspension from said two fractions, subjecting a controlled part of the drained finer particles to a specific gravity separation, returning the remainder of the drained finer particles to the fluid mass, recovering from the fractions obtained in the last-mentioned separation finer particles of a specific gravity higher than the specific gravity of such separation, de-watering the remainder of the last-mentioned fractions and returning to the fluid mass at least part of the water thus obtained and the fine, heavy particles obtained by the last-mentioned recovery.

5. A continuous method for separating a mixture of particles of different specific gravity and wide size range comprising delivering the mixture into a fluid mass consisting of a suspension of water and a sufficient amount of fine suspensoid particles to have a density intermediate that of the particles of the mixture to be separated, maintaining a high concentration of said mixture in the fluid mass by delivery of the mixture at a high rate, subjecting the combined mixture and fluid mass to a force effective to separate the same into a first heavy fraction and a first light fraction, the first heavy fraction containing finer particles, suspension, and substantially all of the coarser higher gravity particles, and the first light fraction containing finer particles, suspension, and substantially all of the coarser lower gravity particles, draining finer particles and suspension from said two fractions, removing a portion of the drained finer particles and suspension substantially corresponding to the portion of such particles in the fluid mass, subjecting said last-mentioned portion to specific gravity separation, and returning the remainder of the drainings to the fluid mass.

6. A method of the character described in claim 1 wherein the thickened part of the washings returned to the fluid mass is so proportioned that the concentration of fine particles in the fluid mass remains constant.

7. A method of the character described in claim 1 wherein the suspensoid particles are particles of the material occurring in the mixture to be separated.

8. A method of the character described in claim 1 wherein particles exogenous to the mixture to be separated are used as suspensoid.

9. A method of the character described in claim 1 wherein magnetite is used as the suspensoid.

10. A continuous method for separating a mixture of particles of different specific gravity and wide size range comprising delivering the mixture into a fluid mass consisting of a suspension of water and a sufficient amount of fine suspensoid particles to have a density intermediate that of the particles of the mixture to be separated, maintaining a high concentration of said mixture in the fluid mass by delivery of the mixture at a high rate, subjecting the combined mixture and fluid mass to a force effective to separate the same into a first heavy fraction containing finer particles, suspension, and substantially all of the coarser higher gravity particles, and a first light fraction containing finer particles, suspension, and substantially all of the coarser lower gravity particles, separately screening said fractions, returning a portion of the fines obtained from said screening to the fluid mass, collecting the remainder of the screenings at a point in overflowing relation to the fluid mass, withdrawing a pre-determined portion of such remainder from such point and subjecting the withdrawn portion to a specific gravity separation.

11. A method of the character described in claim 10 wherein the portion of the screenings returned to the fluid mass is thickened before return to such mass.

12. A method of the character described in claim 10 including recovering from the fractions obtained in the specific gravity separation fine particles of a specific gravity higher than the specific gravity of separation, de-watering the remainder of the last-mentioned fractions, and returning at least part of the water obtained from such de-watering to the fluid mass together with the recovered fine particles of a specific gravity higher than the specific gravity of separation.

13. A continuous method for separating a mixture of particles of different specific gravity and wide size range comprising delivering the mixture into a fluid mass consisting of a suspension of water and a sufficient amount of fine suspensoid particles to have a density intermediate that of the particles of the mixture to be separated, maintaining a high concentration of said mixture in the fluid mass by delivery of the mixture at a high rate, subjecting the combined mixture and fluid mass to a force effective to separate the same into a first heavy fraction and a first light fraction, the first heavy fraction containing finer particles, suspension, and substantially all of the coarser higher gravity particles, and the first light fraction containing finer particles, suspension, and substantially all of the coarser lower gravity particles, draining finer particles and suspension from said two fractions, then washing the drained fractions, thickening the washings and returning such thickened material to said fluid mass, subjecting a controlled part of the drainings to centrifugal separation to obtain a second heavy fraction containing suspension and substantially all of the heavier finer particles and a second light fraction containing suspension and substantially all of the lighter finer particles, classifying the particles of a specific gravity greater than the specific gravity of said last-mentioned separation, and returning to the fluid mass the smaller particles obtained by such classification.

FREERK J. FONTEIN.

(References on following page)

REFERENCES CITED

The following references are of record in the file of this patent:

UNITED STATES PATENTS

| Number | Name | Date |
|---|---|---|
| 2,135,957 | Wuensch | Nov. 8, 1938 |
| 2,190,637 | Rakowsky et al. | Feb. 13, 1940 |
| 2,206,980 | Wade | July 9, 1940 |
| 2,373,635 | Wuensch | Apr. 10, 1945 |
| 2,387,866 | Walker | Oct. 30, 1945 |
| 2,490,365 | Lowe | Dec. 6, 1949 |
| 2,496,590 | Marsh | Feb. 7, 1950 |
| 2,497,790 | Pauvrasseau | Feb. 14, 1950 |

OTHER REFERENCES

Rock Products, October 1948, pages 100–103, Sink-Float Process.

Quarterly of The Colorado School of Mines, Heavy-Density Separation, pages 36 to 42, January 1948, vol. 43, No. 1.